Dec. 17, 1946.  W. FEW  2,412,571
ELECTRONIC TIMING SYSTEM
Filed March 11, 1944  2 Sheets-Sheet 1
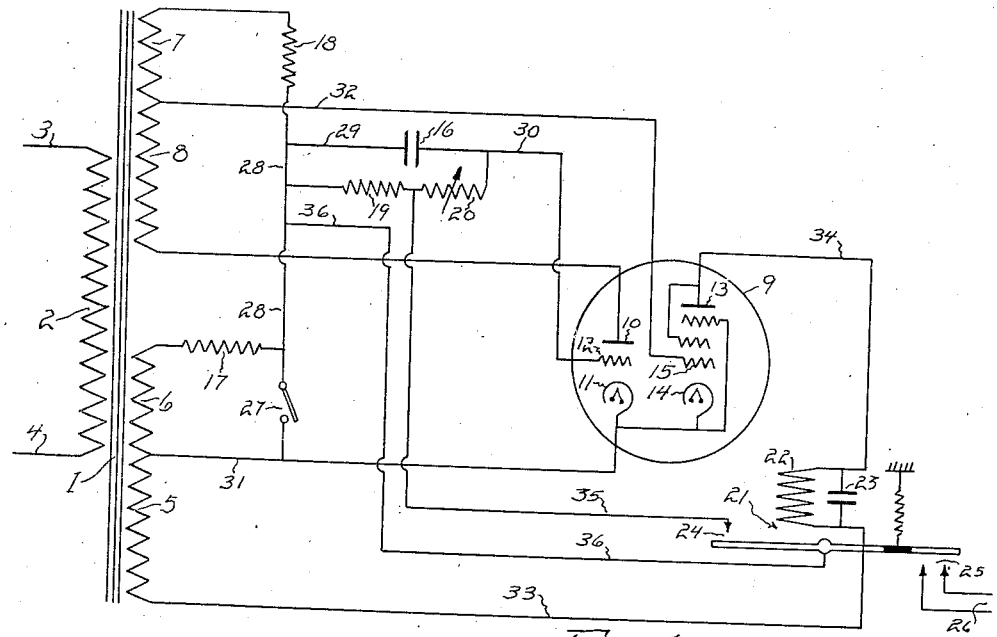
Fig. 1
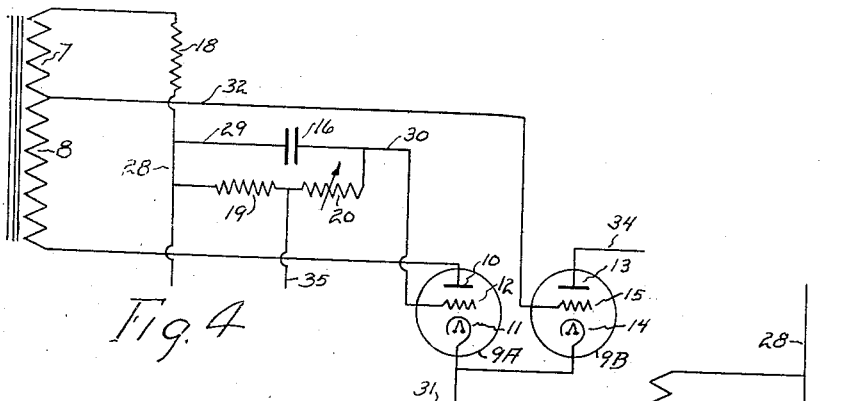
Fig. 4
Fig. 6
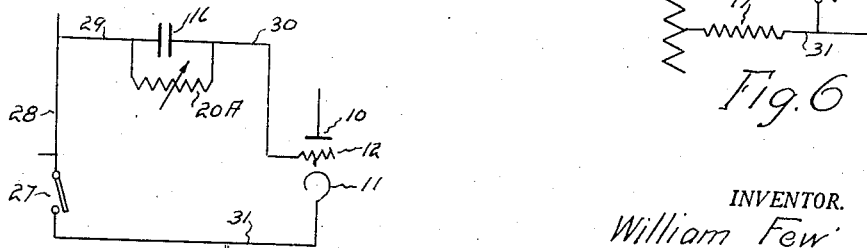
Fig. 5
INVENTOR.
William Few
BY Harry R. Canfield
ATTORNEY Dec. 17, 1946. W. FEW 2,412,571
ELECTRONIC TIMING SYSTEM
Filed March 11, 1944  2 Sheets-Sheet 2

INVENTOR.
William Few
BY Harry R. Canfield
ATTORNEY

Patented Dec. 17, 1946

2,412,571

UNITED STATES PATENT OFFICE 2,412,571

ELECTRONIC TIMING SYSTEM

William Few, East Cleveland, Ohio, assignor to The Clark Controller Company, Cleveland, Ohio, a corporation of Ohio Application March 11, 1944, Serial No. 526,046

5 Claims. (Cl. 250—27)

This invention relates to electronic timing systems of the type in which, upon the closing of a control circuit, a circuit to be controlled is energized and after a timed period is automatically de-energized.

The underlying principles of the invention may be variously embodied, but the particular embodiments thereof chosen for illustrative purposes, and described hereinafter, comprise the following. The winding of an electro-magnetic relay is in the controlled or timed circuit, and this circuit is connected to a first set of anode and cathode electronic space-discharge electrodes, under the control of a first grid. A second anode and cathode set of electrodes under the control of a second grid is also provided. The grids are normally energized at the polarity to prevent current flow between their respective electrode sets, the second grid being energized by a condenser normally kept charged. Upon closing a control circuit by a control contactor, the polarity of the first grid reverses, and discharge current flows in the controlled circuit through the first anode and cathode set and operates the relay; and the condenser discharges at a retarded rate, thereby determining a time period during which the inhibiting potential on the second grid diminishes to a non-inhibiting value. At the end of the time period the second anode and cathode set pass discharge current, the flow of which current causes the polarity of the first grid to again reverse and stop the discharge current in the controlled circuit. This causes the relay to return to the restored condition.

Thus upon closing the control contactor the relay operates, stays operated for a timed period, and then restores.

Contacts on the relay may be provided to control extraneous load circuits as will be understood.

The primary object of the invention is to provide generally an improved timing system having the end results referred to above.

Another object is to provide a timing system having the characteristics and mode of operation referred to above and more fully described hereinafter.

Other objects will be apparent to those skilled in the art to which the invention appertains.

The invention is fully disclosed in the following description taken in connection with the accompanying drawings in which, Fig. 1 is a diagrammatic view of a circuit and apparatus illustrating an embodiment of the invention, in the use of which a control contactor is maintained operated throughout the timed period referred to;

Figs. 2 and 3 are views each similar to Fig. 1, illustrating different embodiments of the invention in the use of which a control contactor may be operated only momentarily to initiate the timed period referred to;

Fig. 4 is a fragmentary view illustrating a modification of either of the embodiments of Figs. 1, 2 or 3, and in which two electronic tubes are employed instead of a single tube as in Figs. 1, 2 and 3;

Figs. 5 and 6 are fragmentary views illustrating modifications which may be employed in either of the embodiments of Figs. 1, 2 or 3;

Figure 2:
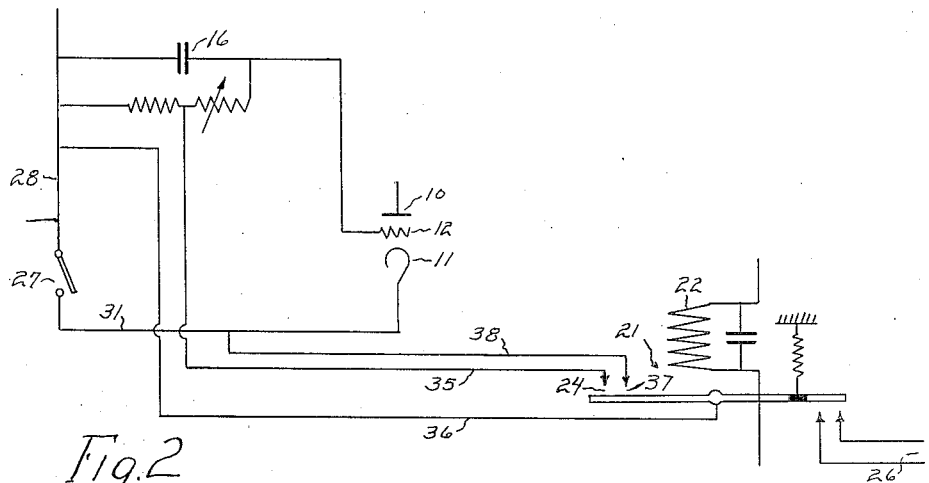

Referring to the drawings I have shown at 1 a transformer having a primary 2 connected to alternating current supply mains 3 and 4 and having secondaries 5, 6, 7, and 8. The derived voltages of the said secondaries may be variously selected, but for illustrative purposes I have found suitable voltages to be 225 volts, 95 volts, 25 volts, and 110 volts for the secondaries 5, 6, 7, and 8 respectively.

At 9 is an electronic tube comprising two sets of electrodes, one set comprising an anode, cathode, and grid, at 10, 11, 12, respectively; and the other set comprising an anode, cathode, and grid, at 13, 14, 15, respectively.

I prefer to use a double tube of this type for purposes of simplicity and economy. Such tubes are available commercially, illustrative of which is the commercial tube RCA 6AD7-G. This tube is a high vacuum tube because of which the two sets of electrodes can function independently.

At 16 is a condenser; a suitable capacity for which may be ¼ micro-farad; and at 17, 18, 19, 20 are resistance units, the unit 20 being adjustable, and suitable values for these resistances being 1500 ohms, 250,000 ohms, one megohm, and 600,000 ohms respectively.

At 21 is an electro-magnetic relay having a winding 22, bridged by a condenser 23, and having normally open control circuit contacts 24. The relay may have also any desired number of normally open or normally closed contacts to control other load circuits and illustrative of this I have shown at 25 normally open contacts controlling the load circuit 26.

The control switch or contactor referred to is shown at 27.

The various circuits and connections and other elements of the system not thus far described will now be described in connection with a description of its operation as a whole.

Upon energization of the transformer secondaries by the primary 2, the 95 volt secondary 6 charges the condenser 16. The charging circuit comprises the resistance unit 17, wire 28, wire 29, condenser 16, wire 30, grid 12, cathode 11, and wire 31; the current flowing between the grid and cathode being that sometimes referred to as the grid current. The grid and cathode act in this respect as a rectifier and pass only alternate half waves of the derived alternating current, and the current is in the direction to charge the condenser so that the plate of the condenser connected to the grid 12 by wire 30 is negative.

The condenser 16 is thus fully charged in the normal state of the system. The resistance units 19 and 20 across the condenser stabilize its charge in a known manner.

The potential across the anode 10 and cathode 11 is the algebraic sum of the potentials of the secondaries 6, 7, and 8 or 40 volts but current flow is prevented by the negatively charged grid 12.

The grid 15 of the tube is also energized to be negative (for positive values of the anode 13), it being in a circuit comprising the secondary 6, wire 28, secondary 7, wire 32, grid 15, cathode 14, and wire 31, and the potential on the grid being the algebraic sum of the voltages of the secondaries 6 and 7, or 70 volts, so that the grid 15 prevents flow of current between the anode 13 and cathode 14 notwithstanding that they have the potential of the secondary 5 or 225 volts impressed thereon.

As will be observed, the winding 22 of the magnetic relay is in the circuit of the anode 13 and cathode 14, the circuit comprising the secondary 5, wire 33, winding 22, wire 34, anode 13, cathode 14, and wire 31, and current flow in that circuit will operate the relay, but normally the relay remains unoperated or restored.

Upon closing the control switch 27 the secondary 6 is in effect cut off from the system, the switch 27 and the resistance unit 17 and wire 31 providing a high resistance by-pass for it. The grid 15 is therefore then energized by the secondary 7 alone, and the grid 15 now becomes positive (for positive values of the anode 13), and current flows between the anode 13 and cathode 14 in the circuit above-described and operates the relay 21.

This relay operating current being rectified by the tube 9 and therefore flowing only on alternate half waves, the condenser 23 is provided to maintain energization of the winding 22 during the other half waves in a well-known manner to hold the relay continuously in operated condition.

When the secondary 6 was by-passed by the control switch 27, the condenser 16 stopped charging. When the relay operated, it closed a lowered-resistance discharge circuit for the condenser 16 at the relay contacts 24, the circuit being, from the condenser, by wire 30, through the adjustable resistance unit 20, by wire 35, contacts 24, wire 36, wires 28 and 29 to the other side of the condenser; the grid to cathode circuit, to maintain the grid 12 effective to prevent flow, now being through the switch 27.

The condenser now discharges through the resistance unit 20 at a rate determined by the adjustment of that unit. At the end of a time period during which the discharge goes on, the negative potential on the grid 12 produced by the condenser has fallen to so low a value that current flow between the anode 10 and cathode 11 starts, these electrodes being in a circuit comprising the switch 27, the resistance unit 18, and the secondaries 7 and 8; the derived potential inducing this flow being the sum of the potentials of the secondaries 7 and 8 or 135 volts.

It will be observed that because of the high resistance of the unit 18, the greater part of the potential drop in the circuit of the electrodes 10 and 11 is accounted for by the drop of potential in the resistance unit 18. It follows that the secondary 7 is of little effect, and that the polarity of the wire 32 and the grid 15 will be negative (for positive values of the anode 13) as soon as the rectified current flow between the anode and cathode 10 and 11 starts; and that this will cause the grid 15 to cut off the flow between the anode 13 and cathode 14 to de-energize the relay and allow it to restore.

In operation therefore, the condenser 16 is charged by the secondary 6; and maintains the grid 12 negative; and the grid 15 is maintained negative by the algebraic sum of the voltages of the secondaries 6 and 7. Upon closing the control switch 27, the secondary 6 is neutralized, and the secondary 7 acting alone, changes the grid 15 to positive, and the anode 13 and cathode 14 pass current which operates the relay 21. The condenser 16 then discharges through the adjustable resistance 20 and contacts 24 on the relay, and after a time period current flows between the anode 10 and cathode 11, induced by the secondaries 7 and 8 and this current, flowing through the high resistance 18 changes the polarity of the grid 15 to negative, and the relay operating current is thereby interrupted and the relay restored.

Upon opening the switch 27, the condenser again charges and renders the grid 12 negative and flow between the anode 10 and cathode 11 is again cut off and the system is ready for another operation.

It will be observed that in the above-described operation of the system of Fig. 1, the control switch 27 is maintained closed for the duration of the timed interval, and this is desirable in certain uses of the system. In some uses, however, it may be desirable to effect the initiation of the timed interval by only a momentary closure of the switch 27, and to render this switch incapable of interrupting the timed interval thus initiated even if the switch be again operated before the interval has been completed. This type of control of various classes of electrical apparatus by a manual switch is sometimes called "non-beat" control. Such a system is shown in Fig. 2.

In this system, the relay 21, besides having the contact 24, has another contact 37 which is closed when the relay operates; and this contact is connected by wire 38 to the wire 31. By this means, upon operation of the relay, the switch 27 is bridged by a circuit comprising the wire 36, contact 37, and wire 38.

Upon momentary closure of the switch 27, and upon the consequent operation of the relay 21, this bridging circuit is closed and the switch 27 may then be opened and the system will go on operating as described for the system of Fig. 1. At the end of the timed period, when the relay 21 opens again and opens the contact 37, the switch 27 being open, the condenser again charges as before preparatory for another operation.

Figure 3:
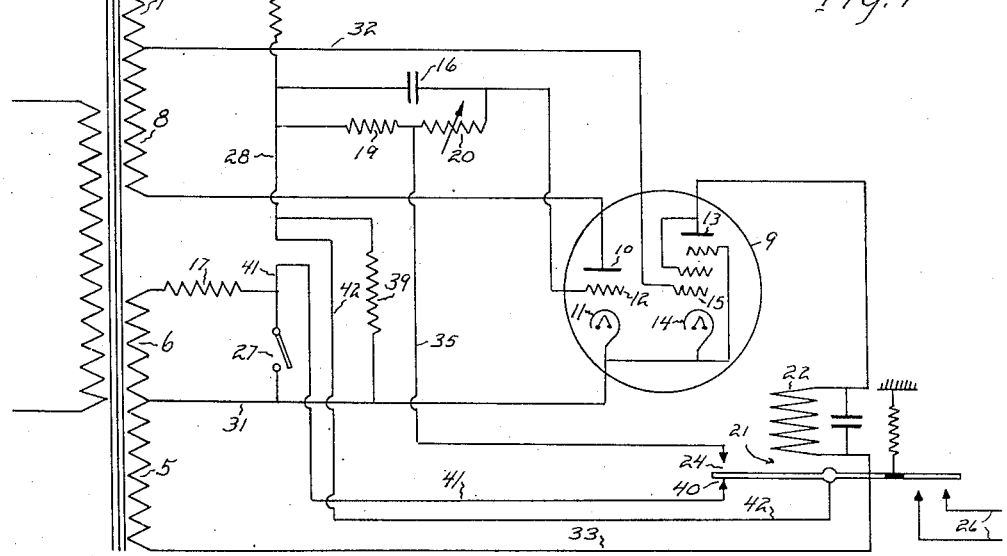

In the form of Fig. 3, a similar "non-beat" manual operation is provided by a different arrangement of contacts on the relay 21 which makes possible the use of a smaller relay requiring less power to operate it. An additional resistance unit 39 is introduced bridging the wires 28 and 31, a suitable ohmic value for which (when the ohmic values of the other resistance units are the same as those mentioned hereinbefore) is 15,000 ohms.

On the relay 21, besides the aforesaid contact 24, which is normally open and is closed when the relay operates, a contact 40 is provided which is normally closed in the open position of the relay.

The condenser 16 is normally maintained charged by the transformer secondary 6 through the resistance unit 17, a wire 41, the contact 40, a wire 42, and thence by wire 28 to the condenser as before, the resistance unit 39 bridging this charging circuit being of sufficiently high ohmic value as not to effectively by-pass the condenser charging current and interfere with its charging. Upon closure of the control switch 27, the secondary 6 is by-passed through the resistance 17 as before and charging of the condenser is interrupted and the relay 21 operates as described before. The circuit for the secondary 7 through wire 32, grid 15, wire 31, and back by wire 28 to the secondary 7, which keeps the grid 15 positive to maintain the relay operated, now takes place through the resistance unit 39 so that the switch 27 may be opened after its momentary closure, or released and allowed to open, if, as would be customary, it is normally held open by a spring, like a push button.

The circuit from the condenser 16 to the grid 12 and to the anode 11, wire 31 and by wire 28 back to the other side of the condenser also takes place through the resistance unit 39 to maintain the grid 12 effective until the time interval has passed. In other respects the operation is the same as that of the other systems. The condenser 16 of course discharges as before through the adjustable resistance 20, wire 35, contact 24, and wire 42, and wire 28 as before.

As to the modifications of Figs. 4, 5, and 6, Fig. 4 illustrates the use of two tubes 9A and 9B instead of a single tube 9 as in the other figures, the anode, cathode, and grid, 10, 11, and 12 respectively being in the tube 9A; and the anode, cathode, and grid, 13, 14, and 15 respectively being in the other tube 9B. The operation is the same as that of the other figures.

As described above for Figs. 1, 2, and 3, a resistance unit 19 is used in connection with the condenser 16 and discharge of the condenser is initiated upon operation of the relay 21, the discharge taking place through the relay contact 24. This is the preferred arrangement particularly when the timed period is to be short. For longer timed periods, the arrangement of Fig. 5 may be used. As shown the adjustable resistor, here 20A, is simply connected across the condenser 16, the resistance unit 19 and the relay contact 24 being dispensed with. When charging of the condenser is stopped, the condenser begins at once to discharge through the resistor 20A. The successive timed periods with this arrangement may vary more than with the preferred arrangement of Figs. 1, 2, and 3 but when the periods themselves are relatively long the variation will be negligible.

Again, in Figs. 1, 2, and 3, the resistance unit 17 associated with the secondary 6 is connected in the line 28. Fig. 6 shows a modification in which it is connected in the line 31. With this position of this resistance unit, it will be observed that, for example in Fig. 1, the voltage impressed upon the circuit including the relay winding 22 and the anode and cathode 13 and 14 of the tube, is that of the sum of the secondaries 5 and 6, and that therefore a larger more powerful relay may be employed for the same size relay as before.

Figure 7:
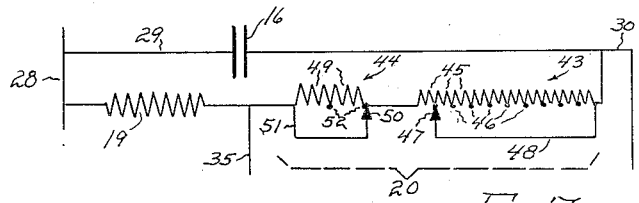
Fig. 7 is a view illustrating a different type of adjustment of an adjustable resistance shown in Figs. 1, 3 and 4.

The adjustable resistor 20 is shown, in the figures described above, by the conventional symbol. In Fig. 7 it is shown more as it would be arranged for adjustment in practice. The resistance 20 is in the two banks 43 and 44. The bank 43 is divided into ten sections 45—45, each with a tapped contact 46; and a movable contact 47 connected by a wire 48 to one end of the bank is movable to any contact. The bank 43 may therefore be cut in or out by tenths.

The bank 44 has two sections 49—49 of equal resistance, and the resistance of each equal to the entire bank 43, and each section has a tapped contact 52. A movable contact 50 connected by a wire 51 to one end of the bank 44 can be moved to either of the contacts 52—52.

By suitably positioning the movable contacts on the tapped contacts of the two banks, the value of the resistance 20 can be changed by thirty steps; to correspondingly change the timing effected by the condenser 16.

The invention is not limited to the exact details illustrated and described. Changes and modifications may be made within the spirit of the invention without sacrificing its advantages and within the scope of the appended claims.

This application is in part a continuation of my copending application Serial No. 432,897, February 28, 1942, for Electronic timing systems.

I claim:

1. In a timing arrangement, a source of alternating potential, a work circuit, an electronic anode and cathode in the work circuit subjected to source derived potential, and a control grid therefor normally negatively energized by a secondary alternating potential derived from the alternating source potential; timing means; a control contactor; a control contactor circuit; means including circuit connections rendered effective upon closing of the contactor circuit to reverse the polarity of the secondary alternating grid energizing potential to immediately start flow of current in the work circuit, and to initiate the running of a time interval by the timing means, and again to reverse the polarity of the secondary alternating grid energizing potential to stop flow of current in the work circuit at the end of the time interval, and maintain it stopped so long as the contactor circuit is maintained closed.

2. In a timing arrangement; a source of potential; a work circuit comprising an electronic space-discharge path subjected to source-derived potential; a grid normally negatively energized by source derived potential and normally preventing current flow in the discharge path and work circuit; a control contactor; a normally charged condenser; means rendered effective upon operation of the contactor to reverse the polarity of the grid energizing potential to thereby start current flow in the work circuit, and rendered effective to start retarded discharging of the condenser; and means subject to condenser potential and rendered effective by the reduction thereof after a time interval of condenser discharging, to again reverse the polarity of the grid energizing potential and stop the flow of current.

3. In a timing arrangement, a source of potential; a work circuit comprising a first electronic space-discharge path subjected to source-derived potential and controlled to normally prevent current flow therein by a first grid normally energized by source derived potential; a normally charged condenser; a second electronic space-discharge path subjected to source-derived potential and controlled to normally prevent current flow therein by a second grid normally negatively energized by the condenser; a control contactor; circuit means rendered effective, upon operation of the control contactor, to reverse the polarity of the energizing potential of the first grid whereby current flow starts immediately in the first discharge path and work circuit, and rendered effective to start retarded discharge of the condenser whereby current flow starts in the second discharge path after a time interval of condenser discharging; and means rendered effective by current flow in the second discharge path to again reverse the polarity of the energizing potential of the first grid to stop the current flow in the first path and work circuit.

4. In a timing arrangement, a source of potential; a work circuit to be controlled subjected to source-derived potential and comprising a first electronic space-discharge path and a first control grid therefor; a second electronic space-discharge path subjected to source-derived potential and a second control grid therefor; connections normally energizing the first grid from source derived potential to prevent current from flowing in the first discharge path and work circuit; a condenser; connections normally maintaining the condenser charged from source derived potential and applying the condenser potential to the second grid to normally prevent current flow in the second discharge path; a control contactor; circuit means rendered effective responsive to operation of the contactor to interrupt charging of the condenser and to reverse the polarity of the energizing potential of the first grid to start current flow in the work circuit, and to initiate retarded discharging of the condenser; current flow in the second discharge path being initiated by said source derived potential upon discharging of the condenser for a predetermined time period; controlling means, responsive to current flow in the said second path, to again reverse the polarity of the energizing potential of the first grid to stop current flow in the work circuit.

5. In a timing arrangement, a source of potential; a transformer energized from the source; a work circuit to be controlled subjected to source derived potential and comprising a first electronic space-discharge path and a first control grid therefor; a second space-discharge path and a second control grid therefor; a first, a second, and a third transformer secondary; connections normally energizing the first grid by the differential potential of the first and second secondaries to normally prevent current flow in the first path and work circuit; a condenser; connections maintaining the condenser charged by potential of the first secondary and applying the condenser potential to the second grid to normally prevent current flow in the second path; a control contactor; circuit connections rendered effective upon operation of the contactor to neutralize the said first secondary and cause the said second secondary to reverse the polarity of the energizing potential of the first grid to cause current flow to start in the first path and work circuit, and to stop charging of the condenser, and to start retarded discharge of the condenser; current flow in the second path being initiated by the sum of the potentials of the second and third secondaries after discharging of the condenser for a predetermined time period; and resistance in the second discharge path producing a drop of potential which effects reversal of the polarity of the energizing potential of the first grid and thereby stops flow of current in the first path and work circuit.

WILLIAM FEW.